United States Patent [19]

Crane

[11] 4,217,211
[45] Aug. 12, 1980

[54] PRESSURIZED TREATMENT OF SEWAGE

[75] Inventor: Theodore H. Crane, Fountain Valley, Calif.

[73] Assignee: BioMass Fuel Conversion Associates, Inc., Yuba City, Calif.

[21] Appl. No.: 55,549

[22] Filed: Jul. 9, 1979

[51] Int. Cl.² ............................................. C02C 1/06
[52] U.S. Cl. ........................................ 210/7; 210/14; 210/15; 210/170; 210/195.3; 210/220; 166/267; 261/77; 261/123; 261/DIG. 75
[58] Field of Search ............... 210/7, 13, 14, 15, 63 R, 210/8, 195.3, 170, 220, 205; 261/28, 77, 123, DIG. 75; 166/105.5, 267, 300

[56] References Cited

U.S. PATENT DOCUMENTS

| 895,229 | 8/1908 | Beddoes | 210/15 |
| 3,607,735 | 9/1971 | Hover | 210/7 |
| 3,655,343 | 4/1972 | Galeano | 210/63 R |
| 3,780,997 | 12/1973 | Hargraves | 261/77 |
| 4,115,258 | 9/1978 | Smith | 210/63 R |

FOREIGN PATENT DOCUMENTS 1473665  5/1977  United Kingdom ...................... 210/14

OTHER PUBLICATIONS

"Breakthrough in Sewage Treatment-Cash, Land, and Energy Level," Water Services, Apr. 1975, 132, 140.
"Large Diameter Drilled Holes Offer New Design Options," Consulting Engineer, Nov. 1977, pp. 128-131.
Bradley, "The ICI Deep Shaft Aeration Process for Effluent Treatment," 29th Annual Atlantic Canada Section, AWWA Meeting, 1976.
"Oxygenation of Aqueous Wastes: The Prost System," Chemical Engineer, Jun. 20, 1977, pp. 117-120.

Primary Examiner—Ernest G. Therkorn
Attorney, Agent, or Firm—K. H. Boswell; Edward D. O'Brian

[57] ABSTRACT

A sewage treatment process wherein sewage is passed into a deep subterranean shaft is improved by passing a liquor of the sewage into the subterranean shaft through an inner shaft which extends only partway down into the subterranean shaft. Located at the lower proximity of the inner shaft is a mixing shaft. The mixing shaft extends from the lower end of the inner shaft to a point near the bottom of the subterranean shaft. Incorporated into the mixing shaft are a plurality of liquor mixing nozzles. The descending sewage liquor passes downwardly through the mixing nozzles to the bottom of the subterranean shaft. It then ascends upwardly in the subterranean shaft. The action of the descending liquor through the nozzles entrains ascending liquor from the subterranean shaft back into the descending liquor. This recirculates the liquor in the bottom of the shaft allowing for extended contact time of the liquor with the microorganisms used in the liquor to aerobically digest the sewage.

9 Claims, 2 Drawing Figures

U.S. Patent  Aug. 12, 1980  4,217,211
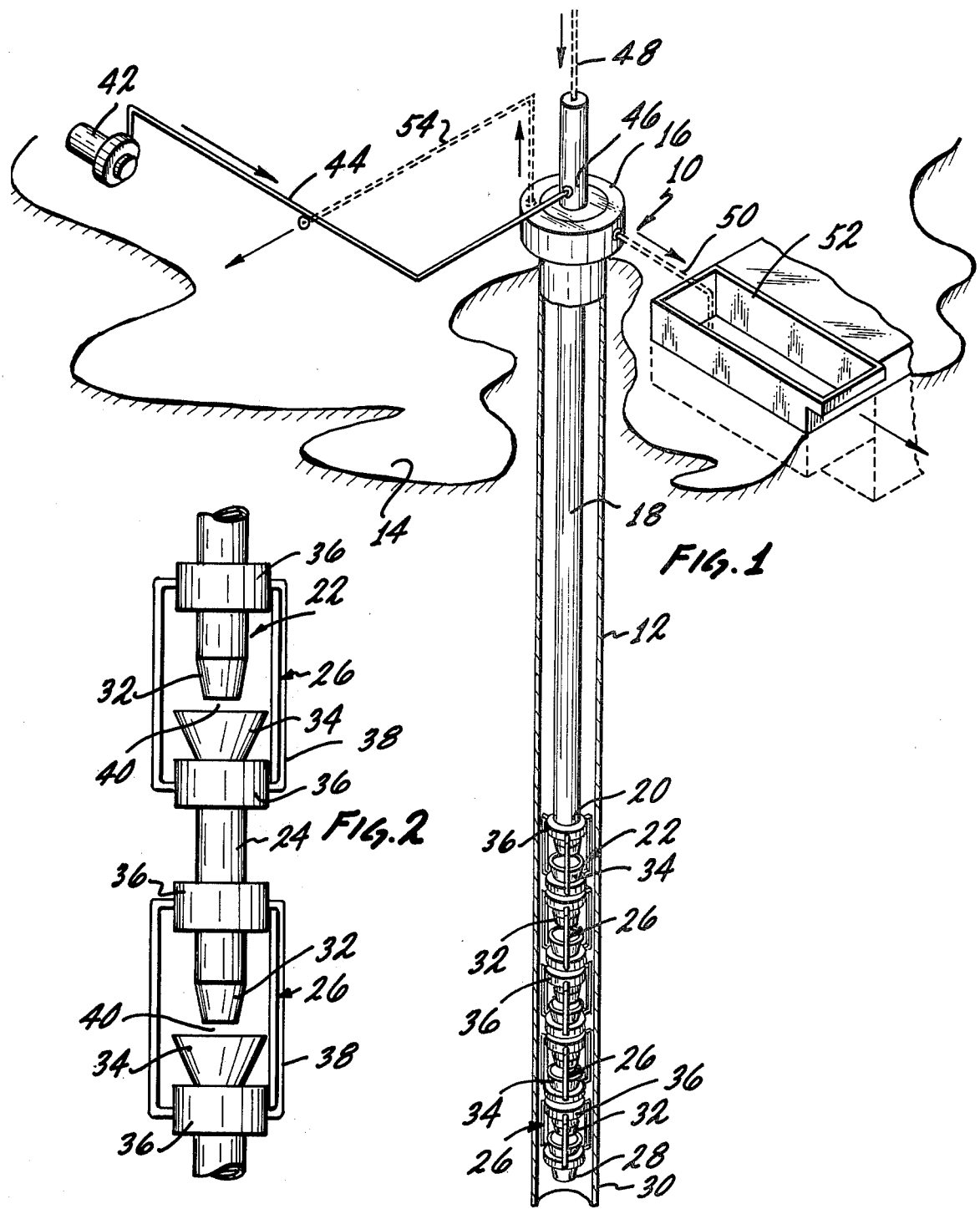

PRESSURIZED TREATMENT OF SEWAGE

BACKGROUND OF THE INVENTION

This invention is directed to an apparatus and process for improved sewage treatment utilizing a deep subterranean shaft as an aerobic digester vessel.

With the urbanization and sophistication of societies the knowledge of sewage treatment has steadily grown. Modern man has come to recognize that raw sewage can no longer simply be dumped into his waterways and/or shallow land excavations. Further, even the undeveloped countries of the world are coming to realize that for adequate public health the treatment of sewage can no longer be considered a luxury, but is a necessity.

The majority of municipal sewage treatment is undertaken utilizing systems that are located on a large area of land surface. Normally incorporated in sewage treatment plants are chambers, ponds or the like wherein the sewage is digested by microorganisms. Together with other sewage apparatus such as clarifiers, aerators, etc. large areas of land must be dedicated to the sewage treatment plants. Further, once the land area is used for sewage treatment it normally cannot be subsequently used for other purposes.

In order to reduce the land use and to achieve a greater efficiency in sewage processing, above ground pressurized sewage digestion vessels have been developed. These digestion vessels take advantage of the increased chemical, enzymatic or biological efficiency brought about by increased oxygen solubility achieved using pressurized vessels. Because this pressure must be artificially created via pumps or equivalent devices energy consumption of these systems must be a serious consideration in their development.

Recently advantage has been taken of the hydrostatic pressure which can be created by using a large digester towers having sufficient fluid head to create an increase in pressure. Power consumption for these apparatuses is said to decrease. They are, of necessity, limited in size, i.e., the amount of hydrostatic pressure head that can be created is dictated by engineering considerations of the physical dimensions of their structure.

To circumvent the engineering problems of an above ground reactor vessel which can be used to create a hydrostatic pressure some pilot plant sewage treatment facilities have been constructed which utilize a shaft sunk into the ground as the pressure tank. These have several advantages. The earth itself provides a supporting structure for the pressure vessel and since the shaft has a very small diameter compared to its depth the land use required with these subterranean shafts is markedly reduced.

In using these subterranean shafts a mixture of raw sewage, air, and a microbiological seed solution (recycled sludge) is injected into the bottom of the shaft via a down flow or downcomer section. Circulation is achieved by causing the mixture of components to descend down the downcomer and then rise within the upflow section of the shaft. Thus, as the "liquor" descends the oxygen solubility within the liquor is increased. Because a constant flow is established any particular increment of a liquor within this flow only has, however, a finite process time and amount of oxygen available to it.

BRIEF SUMMARY OF THE INVENTION

It is considered that the process whereby sewage is treated by passing the sewage into a subterranean shaft to increase oxygen solubility within the liquor being passed into the shaft can be improved by causing the liquor within the lower confines of the shaft to be continually recirculated and re-exposed to additional oxygen liquor being supplied to the pressurized regions of the shaft. It is therefore an object of this invention to provide for an improved apparatus to recirculate ascending liquor into the descending liquor in the lowermost region of the subterranean shaft and concurrently, provide the process wherein this recirculation takes place.

These objects are achieved by providing in a deep well treatment of sewage utilizing an apparatus having an outer elongated shaft, said outer shaft having an upper end and a lower end, said upper end being located at or near the earth's surface and said lower end being located at a subterranean level, an inner elongated shaft located within the outer elongated shaft and including means for passing a descending liquor containing a mixture of influent sewage and a gas containing oxygen through said inner shaft into said outer shaft such that said liquor ascends through said outer shaft and an effluent collecting means for collecting treated liquor at the upper end of said other shaft, the improvement which comprises: said inner shaft having an upper end and a lower end, said upper end of said inner shaft being located at the surface of the earth proximal to the upper end of the outer shaft, and said inner shaft extending downwardly within said outer shaft for only a portion of the length of the outer shaft and a mixing shaft extending downwardly from the lower end of the inner shaft and conveying the descending liquor from the bottom of the inner shaft to the bottom of the outer shaft, said mixing shaft including a plurality of fluid mixing means capable of effecting a turbulent mixing of the contents of the mixing shaft and further providing the fluid mixing means with a plurality of fluid passage means allowing a portion of the ascending mixture in the outer shaft to ingress from the outer shaft back into the descending mixture within the mixing shaft and to be mixed into the descending mixture.

Further, the objects are achieved by providing in a process for aerobic treatment of sewage by passing a liquor of raw sewage, an oxygen containing gas and a microorganism seed suspension in a liquid carrier into an elongated subterranean shaft by descending said liquor into the lower extremities of said subterranean shaft and allowing said liquor to ascend to the surface of said subterranean shaft and improving this process by passing said liquor through an input shaft into the interior of said subterranean shaft to subject the liquor in the interior of the subterranean shaft to hydrostatic pressure to increase the solubility of the oxygen in the liquor and passing the pressurized oxygen containing liquor through a mixing shaft having a plurality of openings along its length and extending between the lower end of the input shaft and the lower end of the subterranean shaft to deposit the liquor at the lower extremity of the subterranean shaft and to entrain a portion of the ascending liquor back into the descending liquor in said mixing shaft by passing said portion of the ascending liquor through the openings in the mixing shaft back into the descending liquor within the mixing shaft.

Preferably the ascending liquor is remixed into the descending liquor within the lower confines of the subterranean shaft by a plurality of nozzles which are located one above the other along the length of the mixing shaft. These nozzles form discontinuities along the length of the mixing shaft allowing for ingress of the ascending liquor into the descending liquor. The liquor containing the raw sewage and air is pumped from the surface under pressure. As this liquor flows through the nozzles the ascending liquor is entrained in the descending liquor by a Venturi effect achieved because each of the lower ends of a superior nozzle is restricted in relationship to the upper end of an inferior nozzle which creates a reduced pressure between the two nozzles.

BRIEF DESCRIPTION OF THE DRAWINGS

This invention will be better understood when considered with the drawing wherein:

FIG. 1 is a distorted oblique view in partial section viewing the apparatus of the invention generally from the top surface in a downward direction;

FIG. 2 is a side elevational view showing the details of a representative portion of that part of the apparatus shown in the lowermost portion of FIG. 1.

This invention utilizes certain principles and concepts as are set forth in the appended claims forming a portion of this specification. Those skilled in the sewage treatment art will realize that these principles and concepts could be applied in a variety of embodiments not necessarily directly mimicking the embodiment described in this specification and shown in the drawing. For these reasons this invention is not to be construed as being limited to the exact embodiment shown and described but is to be construed in light of the appended claims.

DETAILED DESCRIPTION

The apparatus utilized in practicing the invention is used in conjunction with many existing machines and/or apparatuses, the details of which need not be described to fully understand this invention. For this reason for the purpose of this specification certain components which are standard in the art will simply be referred to and not described or numbered. The heart of the invention lies in a vertical subterranean shaft and the components contained therein. The vertical shaft can be one of two types of subterranean shafts. The first of these is a large diameter drilled hole and the second would be a similar mined hole. Either of these two should be considered an equivalent structure; however, the technology of the large diameter drilled holes is rapidly expanding and this is the present preferred method of preparing a suitable hole. Machinery presently exists for drilling holes approximately six feet in diameter. It is expected, however, that the technology in this area will expand allowing the drilling of holes of a much greater diameter, i.e., 20 feet in diameter.

Depending upon the type of ground formation in which this invention is used, once a hole or a well is available it may or may not be necessary to encase the inside of that hole with a suitable concrete or metal liner. For this reason the subterranean shaft 10 of the invention will be identified as having an outer shaft 12 which could interchangeably be either the surface of the rock formation in which the hole was drilled or mined or a suitable liner inserted into said hole.

The outer shaft 12 descends from the earth's surface 14 downwardly for a suitable distance, as hereinafter described, defining the subterranean shaft. On the top of the outer shaft 12 is a suitable shaft cap 16 having a series of ingress and egress openings therein. An inner shaft 18 extends downwardly within the outer shaft 12 for a suitable distance as hereinafter explained. Attaching to the lower end 20 of inner shaft 18 is a mixing shaft 22. Mixing shaft 22 contains several components as is best seen in FIG. 2. A series of identical tubes 24 are interconnected and held in a fixed position by suitable adapters 26. The total length of mixing shaft 22, that is, the tubes 24 and the adapters 26, are suspended from the lower end 20 of inner shaft 18. The mixing shaft 22 has a lower end 28 which is located proximal to the lower end 30 of outer shaft 12.

Interspaced between each of the tubes 24 is a plurality of mixing means composed of the combination of the lower end 32 of tubes 24 being tapered or constricted and the upper end 34 of tubes 24 being flared out into an inverted frustrum shape. A fluid suspension or the like passing downward through tube 24 must pass through the restricted end 32 and then is allowed to expand into the frustrum shaped end 34 of the next tube. This produces a Venturi effect between any two adjacent tubes 24. Each of the tubes 24 including its constricted end 32 and its frustrum end 34 can be considered as a nozzle. In addition, each of the tubes 24 will, for the purpose of this specification, be considered as a superior nozzle to the nozzle directly below it, and likewise, the nozzle below each superior nozzle can be considered as an inferior nozzle directly above it.

The adapters 26 have a suitable mounting ring, collectively identified by the numeral 36, mounted on each superior and inferior nozzle. The mounting rings 36 in turn are connected in pairs between each superior and inferior nozzle by a series of linking members 38. As such the mixing shaft 22 is in effect a compound shaft made up of a plurality of nozzles having an opening or passageway 40 inbetween each two adjacent nozzles.

A pump 42 connected to an appropriate supply vessel, not shown, pumps a liquor consisting of raw sewage and a seed suspension containing an appropriate microorganism into a conduit 44. Conduit 44 discharges its contents into the upper end 46 of inner shaft 18. Also connected to upper end 46 of inner shaft 18 is a gas conduit 48. Preferably compressed air is supplied to conduit 48; however, some other gas containing oxygen in a variant amount up to 100 percent oxygen could ultimately be used. For the remainder of this specification air will be used as the gas supplied to conduit 48. The liquor from conduit 44 flows through a jet eductor (not shown or numbered) located within end 46 which entrains the air from the gas conduit 48 into the liquor.

The liquor now assumed to have gas entrained within it descends down through inner shaft 18 into the subterranean shaft 10. After passing lower end 20 of shaft 18 the liquor then flows through the mixing shaft 22. As this liquor passes from each superior nozzle to the inferior nozzle below it, it is forced through the lower ends 32 of the tubes 24. Upon flowing into the upper ends 34 of tubes 24 the liquor expands creating a low pressure area in the passages 40. The liquor passes through lower end 28 of the mixing shaft 22 and then starts ascending within the space between outer shaft 12 and mixing shaft 22. As the ascending liquor passes each of the passages 40 a percentage of it is caused by the decreased pressure in passage 40 to be re-entrained back into the descending liquor within mixing shaft 22. This causes a constant mixing and agitation within the lowermost portions of subterranean shaft 10. The resident time of of any increment of this liquor is therefore increased over that which would be expected if the liquor simply passed out of the bottom of one shaft and was allowed to ascend up a second shaft.

Of course, some liquor must descend and this ascension continues up the area between outer shaft 12 and inner shaft 18. When this ascending liquor is raised to the earth's surface 14 the liquid which includes suspended solids and soluble gases is passed through shaft cap 16 into discharge conduit 50. From here it can be deposited into a clarifier or other suitable apparatus 52 for further processing. A vent conduit 54 is also incorporated into shaft cap 16 and vents off the gases which are no longer in solution or entrained in the liquor.

A certain percentage of the sludge which is collected in the apparatus 52 is recycled via pump 42 into conduit 44. This sludge contains a seed supply of microorganisms which digest the sewage within the subterranean shaft 10. For initial start-up of a system utilizing this invention a sludge from an existing sewage treatment plant would be introduced to supply the necessary microorganisms. These microorganisms within the confines of the subterranean shaft 10 digest the sewage until typically the $BOD_5$ (Biological Oxygen Demand 5-Day Test) is at a typical acceptable level of around or less than 20 parts per million. The exact level will of course have to be adjusted to meet the existing municipal codes or other regulations. Normally the microorganisms found in a sludge which digest the sewage are viable up to pressures of around 2,000 psi. This places a general limit on the maximum depth of the subterranean shaft 10 of about 2,500 feet.

At a depth within the subterranean shaft 10 wherein the hydrostatic pressure reaches 80 psi the amount of oxygen derived from atmospheric air in solution is equal to the amount of oxygen which would be achieved using pure oxygen at atmospheric pressure. This pressure would generally be achieved at a depth slightly below 200 feet (approximately 61 meters). Therefore, it is generally preferred that the inner shaft 18 extend at least down below this depth and the mixing shaft 22 extend below this depth. A more preferred construction would be to have the inner shaft 18 extend down to about the 500 feet (152 meters) level and the mixing shaft extend below this. Preferably the mixing shaft should extend for an additional 250 feet (76 meters); therefore, in the preferred construction the subterranean shaft would extend down into the earth for at least 750 feet (approximately 229 meters).

Having the mixing shaft 22 extend downwardly from the 500 feet level allows exposure of the microorganisms to an oxygen pressure greater than 50 psi. This, together with the re-entrainment of a portion of the ascending liquor back through the mixing shaft into the descending liquor, ensures that the microorganisms within the liquor have both adequate oxygen supply and time to digest the sewage to produce an inocuous sludge.

The amount of air needed to be entrained into the descending liquor of course depends on the flow rate of the liquor through the shaft. A typical flow rate of about $10^6$ gallons per day would utilize $5 \times 10^5$ ft$^3$ of air per day. This type of volume could typically be handled with an 800 feet subterranean shaft having a 30-inch diameter. Alternately, a deeper shaft of say 1500 feet with only a 12-inch diameter would achieve similar results.

Flow is started through the subterranean shaft by inducing a downward flow within the inner shaft 18. Once flow is started, as the ascending liquor ascends it is exposed to a decreasing hydrostatic pressure effect. This allows some of the air and oxygen that was solubilized by the hydrostatic pressure head to come out of the solution and form air bubbles which tend to rise to the surface and impart a force causing the ascending liquor to flow upward within the outer shaft 12. Because of this force imparted by the bubbles, less force is needed, i.e., energy expenditure, to maintain circulation within the subterranean shaft 10. Additionally the bubbles in the ascending liquor act as collectors for oil and grease within the sewage and help create a froth of the oils and greases which can easily be separated from the sludge downstream from the subterranean shaft 10. Additionally, the hydrostatic pressure deep within the subterranean shaft 10 will collapse air cells and the like within living organic matter such as algae so that after exiting from such subterranean shaft this type of organic matter is more efficiently separated from the remaining components of the ascending liquor.

I claim:

1. In a deep well treatment of sewage utilizing an apparatus having an outer elongated shaft, said outer shaft having an upper end and a lower end, said upper end being located at or near the earth's surface and said lower end being located at a subterranean level, and an inner elongated shaft located within the outer elongated shaft and including means for passing a descending liquor containing a mixture of influent sewage and a gas containing oxygen through said inner shaft into said outer shaft such that said liquor ascends through said outer shaft and an effluent collecting means for collecting treated liquor at the upper end of said outer shaft, the improvement which comprises:

said inner shaft having an upper end and a lower end, said upper end of said inner shaft being located proximal to said upper end of said outer shaft, said inner shaft extending downwardly within said outer shaft for only a portion of the length of said outer shaft;

a mixing shaft located within said outer shaft and attaching to the lower end of said inner shaft and extending from said lower end of said inner shaft to the lower end of said outer shaft;

said mixing shaft including a plurality of fluid mixing means capable of effecting a turbulent mixing of said liquor as said liquor passes from said inner shaft through said mixing shaft and into said outer shaft.

2. The apparatus of claim 1 wherein:
said plurality of fluid mixing means includes a plurality of fluid passage means allowing said ascending liquor in said outer shaft to ingress from said outer shaft back into said descending liquor within said mixing shaft and to be mixed into said descending liquor.

3. The apparatus of claim 2 wherein:
said plurality of fluid mixing means comprises a plurality of static mixing means having no moving parts and capable of mixing said ascending liquor from said outer shaft into said descending liquor within said mixing shaft.

4. The apparatus of claim 3 wherein:
said plurality of static mixing means comprises a plurality of mixing nozzles located one above the other along the length of said mixing shaft.

5. The apparatus of claim 4 wherein:

said plurality of mixing nozzles each comprise a tube having an upper end and a lower end and an integral section connecting said upper end and said lower end;

said upper end having a wall having an inverted frustrum shape and said lower end having an opening, said opening being of a smaller diameter than the diameter of said integral section;

said opening of a superior nozzle being located adjacent to said frustrum shaped wall of an inferior nozzle;

said plurality of fluid passage means comprising the spaces between each superior nozzle and inferior nozzle.

6. In a process for aerobic treatment of sewage by passing a liquor of raw sewage, an oxygen containing gas and a microorganism seed suspension in a liquid carrier into an elongated subterranean shaft by descending said liquor into the lower extremity of said subterranean shaft and allowing said liquor to ascend to the surface of said subterranean shaft, the improvement which comprises:

passing said liquor in a descending direction through an input shaft into the interior of said subterranean shaft to subject said liquor to hydrostatic pressure to effect increased solubility of said oxygen into said liquor;

passing said pressurized oxygen containing liquor from said input shaft into a mixing shaft located below said input shaft and extending downwardly to the bottom reaches of said subterranean shaft;

moving said liquor through said mixing shaft to deposit said liquor at the bottom reaches of said subterranean shaft;

ascending said liquor up said subterranean shaft;

continuously entraining a portion of said ascending liquor back into said liquor descending down through said mixing shaft by passing said portion of said ascending liquor through a plurality of openings in said mixing shaft in causing said entrained portions to be mixed within said descending liquor within said mixing shaft.

7. The process of claim 6 wherein:

said oxygen containing gas is air and said descending liquor is pressurized to at least 80 psi.

8. The process of claim 6 wherein:

said input shaft extends at least 500 feet into said subterranean shaft.

9. The process of claim 8 wherein:

said mixing shaft extends at least 250 feet below said input shaft.

* * * * *